United States Patent [19]

Sasaguri et al.

[11] 3,875,284
[45] Apr. 1, 1975

[54] PROCESS FOR PREPARING CLEAR POLYOXYMETHYLENE FILM

[75] Inventors: Kiichiro Sasaguri; Takeo Yuasa; Kazuhiko Shimura, all of Tokyo, Japan

[73] Assignee: Asahi Kasei Kogyo Kabushiki Kaisha, Osaka, Japan

[22] Filed: Sept. 25, 1972

[21] Appl. No.: 291,571

[52] U.S. Cl. .............................. 264/288, 264/289
[51] Int. Cl. ............................................ B29d 7/24
[58] Field of Search ........ 264/280, 175, 210 R, 288, 264/289, DIG. 73; 260/67 FP

[56] References Cited
UNITED STATES PATENTS

| | | | |
|---|---|---|---|
| 2,952,878 | 9/1960 | Swerlick et al. | 264/289 |
| 3,083,410 | 4/1963 | McGlamery | 264/289 |
| 3,354,023 | 11/1967 | Dunnington et al. | 264/288 |

FOREIGN PATENTS OR APPLICATIONS

| | | | |
|---|---|---|---|
| 1,147,595 | 4/1969 | United Kingdom | 264/288 |

*Primary Examiner*—Robert F. White
*Assistant Examiner*—James B. Lowe
*Attorney, Agent, or Firm*—Cooper, Dunham, Clark, Griffin & Moran

[57] ABSTRACT

A clear crystalline polyoxymethylene film prepared by the process comprising preheating the film to a temperature not lower than 20°C. below a temperature within the range from that at which polyoxymethylene crystals begin to melt to that at which polyoxymethylene crystals finish melting, and rolling the preheated film to a thickness not greater than 95 percent of the original thickness through heated pressing rollers while maintaining the temperature of the film within the aforementioned range and simultaneously or immediately stretching the thus rolled film to such an extent that the thickness of the stretched film is reduced from 1/1.2 to 1/6 of the original thickness.

8 Claims, 3 Drawing Figures

PROCESS FOR PREPARING CLEAR POLYOXYMETHYLENE FILM

BACKGROUND OF THE INVENTION

This invention relates to a process for preparing highly clear polyoxymethylene film. Polyoxymethylene film has high crystallinity ranging from about 50 percent to about 75 percent which depends on the manner in which the film is produced. Polyoxymethylene films have been conventionally prepared by melt pressing or melt extrusion, normally followed by quenching. The films obtained with these methods, however, are lacking in clarity. Such films have been prepared by a variety of methods but range from opaque to translucent. Thus the attempts to improve the clarity of polyoxymethylene film have so far been unsuccessful and the film is difficult to handle. (This seems to be due to the presence of relatively large spherulites in the crystal structure.)

A number of methods have so far been derived for preparing polyoxynethylene film. For example, British Pat. No. 1,147,595 discloses a method wherein the film is simply stretched, without applying pressure, at a temperature about 40°C below the temperature at which crystals melt. However, the resultant film is not clear.

U.S. Pat. No. 2,952,878 describes the preparation of polyoxymethylene film in which the film is rolled with rollers that are kept at a temperature from about 120°C to 20°C, preferably 100°C to 20°C, while the film itself is not heated, followed by heating of the film at about from 120°C to 180°C and stretching of the film at that temperature by from 1.5 to 3.0 times the original dimension. This method, however, has recognized deficiencies, e.g., the clarity of the film is below 80 percent.

Thus, none of the conventional methods provides for satisfactorily clear polyoxymethylene films.

SUMMARY OF THE INVENTION

This invention involves a process for preparing highly clear polyoxymethylene film which comprises rolling a preheated film at a temperature between the temperature at which polyoxymethylene crystals begin to melt and the temperature at which polyoxymethylene crystals finish melting with the thickness of the rolled film being not greater than 95% of the original thickness, and simultaneously or immediately stretching the thus rolled film to such an extent that the thickness of the stretched film is reduced to from 1/1.2 to 1/6 of the original thickness.

DETAILED DESCRIPTION OF THE PRESENT INVENTION

Figure 1:
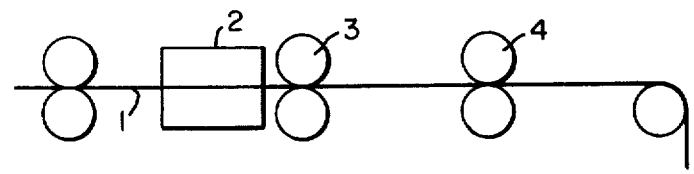
FIG. 1 is a schematic sectional view of a system for performing the steps of the present invention. In the drawing, 1 is untreated film, 2 is a preheater, 3 is a pressing roller and 4 is a pinch roller.

The present invention will now be explained with reference to FIG. 1, wherein the film 1 is heated by preliminarily passing through a preheater 2. The preheating step of the present invention is present to preliminarily heat the film so that just prior to rolling the actual temperature of the film is kept at a temperature no lower than 20°C. below, and no higher than, the temperature of pressing rollers 3. The temperature of pressing rollers 3 is substantially equal to that of the film and typically is not more than 3°C to 5°C higher than the temperature of the film. The temperature range of rolling being narrow, the preheating step is indispensable in view of the fact that the homogeneous pressing must be carried out within a specified rolling temperature range. Unless the film is preliminarily heated prior to rolling, uneven thickness and clarity result in the rolled film. Consequently the preheating temperature depends on the thickness of the film and the velocity at which the film is directed to the pressing-rollers 3. Usually then the preheating temperature is no lower than 20°C. below, and not higer than the temperature of the pressing rollers 3, since this temperature range is of the utmost importance for the invention.

Thus heated film is rolled between the pressing rollers 3 at a temperature between a temperature at which polyoxymethylene crystals begin to melt and a temperature at which polyoxymethylene crystals finish melting and maintained within the temperature range during the rolling procedure.

The rolled film is then directed through pinch rollers 4 for stretching. Roller 4 rotate faster than the pressing rollers 3 so that film is stretched to such an extent that the thickness of the stretched film is from 1/1.2 to 1/6 of the original thickness of the untreated film. At this time, the pressure of rollers 3 depends on the number and size of spherulites present in the film and the thickness of the film. The pressure of pressing rollers 3 should be kept at such a value that the thickness of the rolled film is not greater than 95 percent of the original thickness.

According to above-mentioned process, highly clear polyoxymethylene film can be obtained.

Figure 2:
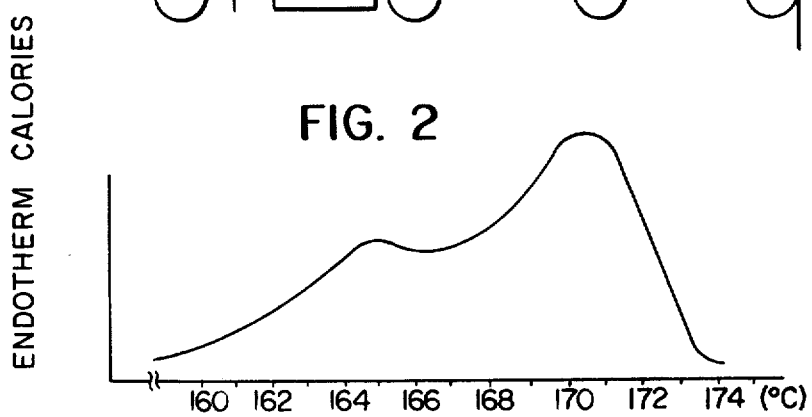
FIG. 2 is a melting chart obtained by means of a differential scanning calorimeter for polyoxymethylene film having an intrinsic viscosity of 1.75.

In. FIG. 2 the temperature range from about the temperature at which polyoxymethylene crystals begin to melt to the temperatuare at which polyoxymethylene crystals finish melting refers to the range in which an endotherm peak is present when endotherm calories are measured at a rate of temperature increase of 1°C/minute with a differential scanning calorimeter. The left axis of the graph represents endotherm calories. For example when a measurement is made on polyoxymethylene having an intrinsic viscosity of 1.75, it refers to the range of from 160°C. to 174°C. as shown in FIG. 2.

The temperature range with limits not lower than the temperature at which crystals begin to melt and not higher than the temperature at which crystals finish melting is of utmost importance in accordance with the present invention since in this temperature range crystals are in a partially melting state and consequently the mobility of the molecular chain is quite high. Therefore, if rolling and stretching are carried out under such conditions, the formation of spherulites which cause haziness of the product is suppressed and highly clear film is obtained. In U.S. Pat. No. 2,952,878, rolling of film kept at a room temperature is accomplished at a temperature not higher than 120°C. Since within this temperature range the mobility of the molecular chain is low, even rolling with a considerably great pressure cannot completely remove the spherulites. Further, above this temperature range, the film may adhere to the pressing rollers or it may break due to the loss of bonding energy within the film. It should be noted that within this temperature range, the film is rolled. Since the temperature of film rises while it is rolled and stretched, care must be taken so that the temperature of the film does not exceed the melting point.

In the stretching step of the present invention, stretching should be done simultaneously with rolling, which enables the obtaining of film of even thickness and clarity and enhanced mechanical strength. The draw ratio in the machine direction, that is, the direction of film travel, is such that the thickness of the film is from about 1/1.2 to 1/6 of its original thickness. If the draw ratio is more than this range, uneven thickness and clarity result, while if it is less than this range, the film breaks. Polyoxylethylenes within the purview of the present invention refer to homopolymers and copolymers of polyoxymethylenes containing from about 80 to 95 percent recurring units of oxymethylene typically terminated with acyl or isocyanate groups. The range of intrinsic viscosity of such polyoxymethylenes is from about 0.9 to 2.7 as measured at 60°C on a 0.5% solution of the polyoxymethylenes in para-chlorophenol at 60°C. The polyoxymethylenes have a reaction constant for thermal degradation at 222°C (hereinafter referred to as $K_{222}$) of less than 0.05 percent when measured as described in U.S. Pat. No. 2,994,687.

The thickness of the films produced in accordance with the invention is from $10\mu$ to $300\mu$ and the films are characterized by a clarity of greater than 80 percent and uniform thickness.

The measurements of the properties of the film as set forth in the following examples were carried out by the following procedure.

Clarity

A photoelectric colorimeter manufactured by Shimazu Seisakusho was used. The light was day light coming from a Sodium lamp as its source through a filter. The light is usually called a C light source according to C.I.E. representation. The transmittance of this light was measured and converted to a value corresponding to a film of $100\mu$ thickness. This method is in accordance with JIS K-6714.

Uneven thickness and Uneven clarity

One hundred small test pieces were made by dividing each side of a 50 cm × 50 cm film into 10 parts and 10 test pieces were randomly picked therefrom. The thickness of each test piece was measured. The difference between the maximum value and the minimum value of each measured value are given as uneven thickness.

As to uneven clarity, the clarity of each test piece was measured in the afore-mentioned method and the difference between the maximum value and the minimum value of each measured value is given.

The polyoxymethylene film prepared according to the present invention is highly clear and is useful in a large variety of applications in the fields where clarity is required, such as in photographic films, wrapping of foods, medicines and fabrics, blistor packaging, general building materials and upholstery.

The following non-limiting examples are given by way of illustration only.

EXAMPLE 1

Polyoxymethylene having an intrinsic viscosity of 1.75 and a $K_{222}$ of 0.02 percent was extruded through a slit die and rapidly quenched to give untreated films. The thickness of the film was $250\mu$. and the clarity 1.1 percent.

Each fo the resulting films was preliminarily heated by passing through an oven kept at 150°C. and then directed between pressing rollers kept at a temperature set forth in Table 1 in the rolling ratio based on the thickness of the unrolled film set forth in Table 1. Simultaneously the film was stretched in the machine direction at a draw ratio based on the original thickness set forth in Table 1. The properties of the film thus obtained are shown in Table 1.

EXAMPLE 2

The same untreated film as used in Example 1 was preheated at 150°C. and rolled with pressing rollers kept at 165°C. The thickness of the rolled film was 70 percent of the original thickness. Simultaneously the film was stretched to such an extent that the thickness was reduced to one-half of the original thickness, and then further stretched in a direction transverse to the machine (initial) direction to such an extent that the thickness of the film was one-half of the thickness of the film before transverse stretching. The properties of the film are shown in Table 2.

EXAMPLE 3

Polyoxymethylene having an intrinsic viscosity of 1.35 and a $K_{222}$ of 0.03 percent was extruded through a slit die and rapidly quenched to give untreated film. The thickness of the film was $600\mu$. and the clarity 0.5 percent. The range from the temperature at which the polyoxymethylene crystals having an intrinsic viscosity of 1.35 begin to melt to that at which said crystals finish melting is from 158°C. to 175°C. when measured by a differential scanning calorimeter.

The film was preliminarily heated by passing through an oven kept at 155°C. and then directed between pressing rollers kept at 165°C. The thickness of the rolled film was 65 percent of the original thickness. Simultaneously the film was stretched in the machine direction to an extent of one-third the original thickness. The properties of the film are shown in Table 3.

EXAMPLE 4

Polyoxymethylene copolymer consisting of 92 mole percent of trioxane and 8 mole percent of ethylene oxide and having an intrinsic viscosity of 2.2 and a $K_{222}$ of 0.01 percent was extruded through a slit die and rapidly quenched to give untreated film. The thickness of the film was $100\mu$ and the clarity 13 percent. The range from the temperature at which the polyoxymethylene crystals begin to melt to that at which said crystals finish melting is from 155°C. to 170°C. when measured by a differential scanning calorimeter. The film was preliminarily heated by passing through an oven kept at 145°C. and then directed between pressing rollers kept at 160°C. The thickness of the rolled film was 65 percent of the original thickness. Simultaneously the film was stretched to such an extent that the thickness of the film was one-fourth of the original thickness. The properties of the film are shown in Table 3.

Comparative Example 1

Using the same untreated films as used in Example 1 polyoxymethylene films were produced under the conditions set forth in Table 4 in a similar to that of Example 1. The properties of the films thus obtained are shown in Table 4.

Figure 3:
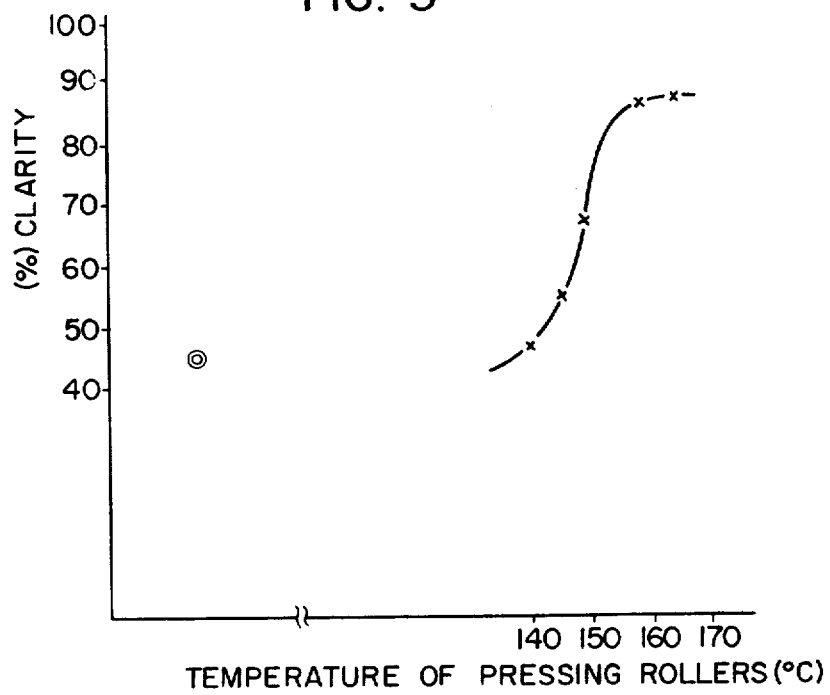
FIG. 3 is a curve representing the relation of clarity of pressure-stretched film vs. temperature of pressing rollers.

The clarity of the pressure-stretched films in Run Nos. 1, 3, 5 and 6 of comparative Example 1 and Run Nos. 1 and 2 of Example 1 vs. the temperature of pressing rollers are shown in FIG. 3.

Polyoxymethylene films appropriate for use with this invention are well known in the art and include for example, the films described in U.S. Pat. No. 2,768,944 and 2,952,878 as well as in British Pat. No. 1147,595 the disclosures of which are incorporated herein by reference.

What is claimed is:

1. The process for preparing clear polyoxymethylene film including the step of passing said film through heated pressing rollers maintained at a temperature within the range from that at which the polyoxymethylene crystals begin to melt to that at which said crystals finish melting which comprises:
   a. preheating the film at a temperatuare not lower than 20°C. below the temperature of said pressing rollers and not higher than the temperature of said pressing rollers;
   b. rolling the preheated film to a thickness not greater than 95 percent of the original thickness through said heated pressing rollers while maintaining the temperature of the film within said range; and
   c. simultaneously stretching the film thus rolled to such an extent that the thickness of the stretched Table 1

| Run No. | Preheating temperature (°C.) | Temperature of pressing rollers (°C.) | Rolling ratio (%) | Draw ratio (thickness) | Clarity (%) | Uneven Clarity (%) | Uneven thickness of film (μ) |
|---|---|---|---|---|---|---|---|
| 1 | 150 | 160 | 65 | ¼ | 85 | 2 | 3 |
| 2 | 150 | 165 | 65 | ¼ | 88 | 2 | 3 |
| 3 | 150 | 170 | 65 | ¼ | 89 | 1 | 4 |
| 4 | 150 | 160 | 40 | ¼ | 89 | 2 | 2 |
| 5 | 150 | 160 | 90 | ¼ | 83 | 3 | 3 |
| 6 | 150 | 160 | 65 | ½ | 84 | 4 | 4 |
| 7 | 150 | 160 | 65 | 1/5 | 86 | 2 | 2 |

Table 2

| Example No. | Clarity (%) | Uneven Clarity (%) | Uneven thickness of film (μ) | Strength (kg./mm²) MD | Strength (kg./mm²) TD | Elongation (%) MD | Elongation (%) TD | Modulus (kg./mm²) MD | Modulus (kg./mm²) TD | Thickness (μ) |
|---|---|---|---|---|---|---|---|---|---|---|
| 2 | 88 | 2 | 1 | 15.3 | 11.6 | 9 | 3 | 538 | 485 | 6 |

MD: Machine direction
TD: Transverse direction

Table 3

| Example No. | Preheating temperature (°C.) | Temperature of pressing rollers (°C.) | Rolling ratio (%) | Draw ratio (thickness) | Clarity (%) | Uneven Clarity (%) | Uneven thickness of film (μ) |
|---|---|---|---|---|---|---|---|
| 3 | 155 | 165 | 65 | ⅓ | 83 | 5 | 6 |
| 4 | 145 | 160 | 65 | ¼ | 87 | 2 | 1 |

Table 4

| Run No. | Preheating temperature (°C.) | Temperature of pressing rollers (°C.) | Rolling ratio (%) | Draw ratio (thickness) | Clarity (%) | Uneven Clarity (%) | Uneven thickness of film (μ) |
|---|---|---|---|---|---|---|---|
| 1 | 20 | 20 | 65 | ¼ | 45 | 15 | 16 |
| 2 | 20 | 160 | 65 | ¼ | 69 | 17 | 11 |
| 3 | 130 | 140 | 65 | ¼ | 52 | 18 | 7 |
| 4 | 130 | 160 | 65 | ¼ | 80 | 13 | 6 |
| 5 | 135 | 145 | 65 | ¼ | 59 | 11 | 8 |
| 6 | 140 | 150 | 65 | ¼ | 66 | 10 | 6 |
| 7 | 150 | 180 | 65 | ¼ | film adhered to pressing rollers | | |
| 8 | 150 | 160 | 100 | ¼ | 32 | 8 | 3 |
| 9 | 150 | 160 | 97 | ¼ | 73 | 7 | 3 |
| 10 | 150 | 160 | 65 | 1/1 | 81 | 13 | 19 |
| 11 | 150 | 160 | 65 | 1/7 – 8 | film broke when stretched | | | film is reduced to from 1/1.2 to 1/6 of the original thickness.

2. The process of claim 1 wherein the intrinsic viscosity of said polyoxymethylene is from about 0.9 to 2.7.

3. The process of claim 1 wherien the intrinsic viscosity of the polyoxymethylene is 1.75 and said temperature range is between k160°C and 174°C.

4. The process of claim 1 wherein the intrinsic viscosity of the polyoxymethylene is 1.35 and said temperature range is between 158°C to 175°C.

5. The process of claim 1 wherein the intrinsic viscosity of the polyoxymethylene is 2.2 and said temperatuare range is between 155°C and 170°C.

6. The process of claim 1 wherein the preheating temperature of the film is further determined in accordance with the thickness and velocity of rolling.

7. The process of claim 1 wherein the rolling pressure is determined in accordance with the number of size of the spherulites present in the film and the thickness of the film.

8. The process of claim 1 wherein the film is stretched in two perpendicular directions.

* * * * *